Feb. 3. 1925.　　　　　　　　　　　　　　　　　　　　　1,524,841
A. E. RHOADES
FEELER MECHANISM FOR LOOMS
Filed March 18, 1924　　2 Sheets-Sheet 1

INVENTOR:
Alonzo E. Rhoades
BY
ATTORNEY

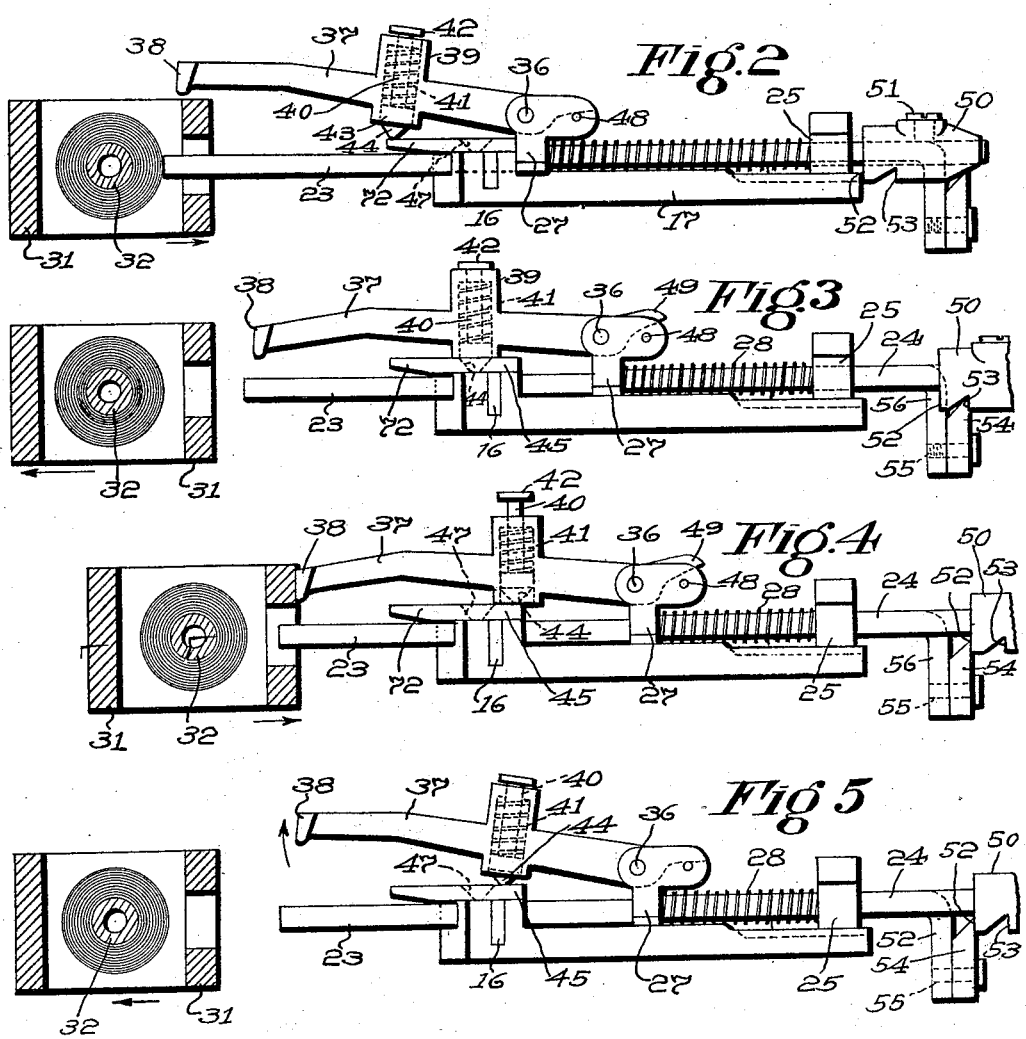

Patented Feb. 3, 1925.

1,524,841

UNITED STATES PATENT OFFICE.

ALONZO E. RHOADES, OF HOPEDALE, MASSACHUSETTS, ASSIGNOR TO DRAPER CORPORATION, OF HOPEDALE, MASSACHUSETTS, A CORPORATION OF MAINE.

FEELER MECHANISM FOR LOOMS.

Application filed March 18, 1924. Serial No. 699,983.

*To all whom it may concern:*

Be it known that I, ALONZO E. RHOADES, a citizen of the United States, residing at Hopedale, in the county of Worcester and State of Massachusetts, have invented an Improvement in Feeler Mechanisms for Looms, of which the following description, in connection with the accompanying drawings, is a specification, like characters on the drawings representing like parts.

This invention relates to feeler mechanisms for looms and more particularly to feeler mechanisms of the intermittent type.

As ordinarily constructed, the feeler of the feeler mechanism is under the influence of a spring or yielding device, tending to move it into its rearward feeling position, and if it remains in this position during the weaving operation its recurrent contacts with the filling in the shuttle on detecting beats injuriously affect the filling, especially where the filling is of fine count or silk. Since the function of the feeler is to call for a change of filling when that in the active shuttle has become substantially but not quite exhausted, it is unnecessary that the feeler should contact with the filling on each detecting beat while a working supply is in the shuttle, but only that it should perform its feeling function on the approach to substantial exhaustion of the filling. It is an object of the present invention, therefore, to provide a feeler mechanism in which the feeler shall have periods of activity and periods of inactively during weaving, and preferably the periods of activity of the feeler are made of relatively shorter duration than the periods of inactivity, with the result that the injurious contact with the filling is overcome and the feeler is enabled to call for a change of filling when that in the shuttle is substantially exhausted. In accordance with the present invention, the feeler has associated with it a bunter which is rendered operative by movement of the feeler to move the feeler into a position beyond the reach of the filling in the shuttle on a detecting beat where it is held during its periods of inactivity.

A further object of the present invention is to provide a feeler mechanism of the intermittent type of simple and compact construction and which will nevertheless have periods of activity and periods of inactivity, and during such periods of inactivity shall be held in a position out of contacting relation with the filling on detecting beats and be released at intervals to its periods of activity that it may function to call for a change of filling when that in the active shuttle has become substantially exhausted.

The invention and new combination of parts and the novel features thereof will be made clear by the following description and the accompanying drawings of one good practical form thereof.

In the drawings:

Fig. 2 is a sectional side elevation showing the feeler in its rearward feeling position and the relation of parts at such times;

Fig. 3 is a similar view showing the feeler as having been moved frontwardly by a working supply of filling on a detecting beat and the changed relation of parts at such times;

Fig. 4 is a view similar to that of Figs. 2 and 3 showing the feeler as being moved frontwardly by the bunter on a beat-up of the lay into a position beyond the reach of the filling on a subsequent detecting beat; and Fig. 5 is a view similar to that of Figs. 2, 3 and 4, showing the relation of parts when the feeler is held in its frontward retracted or inoperative position.

Figure 1:
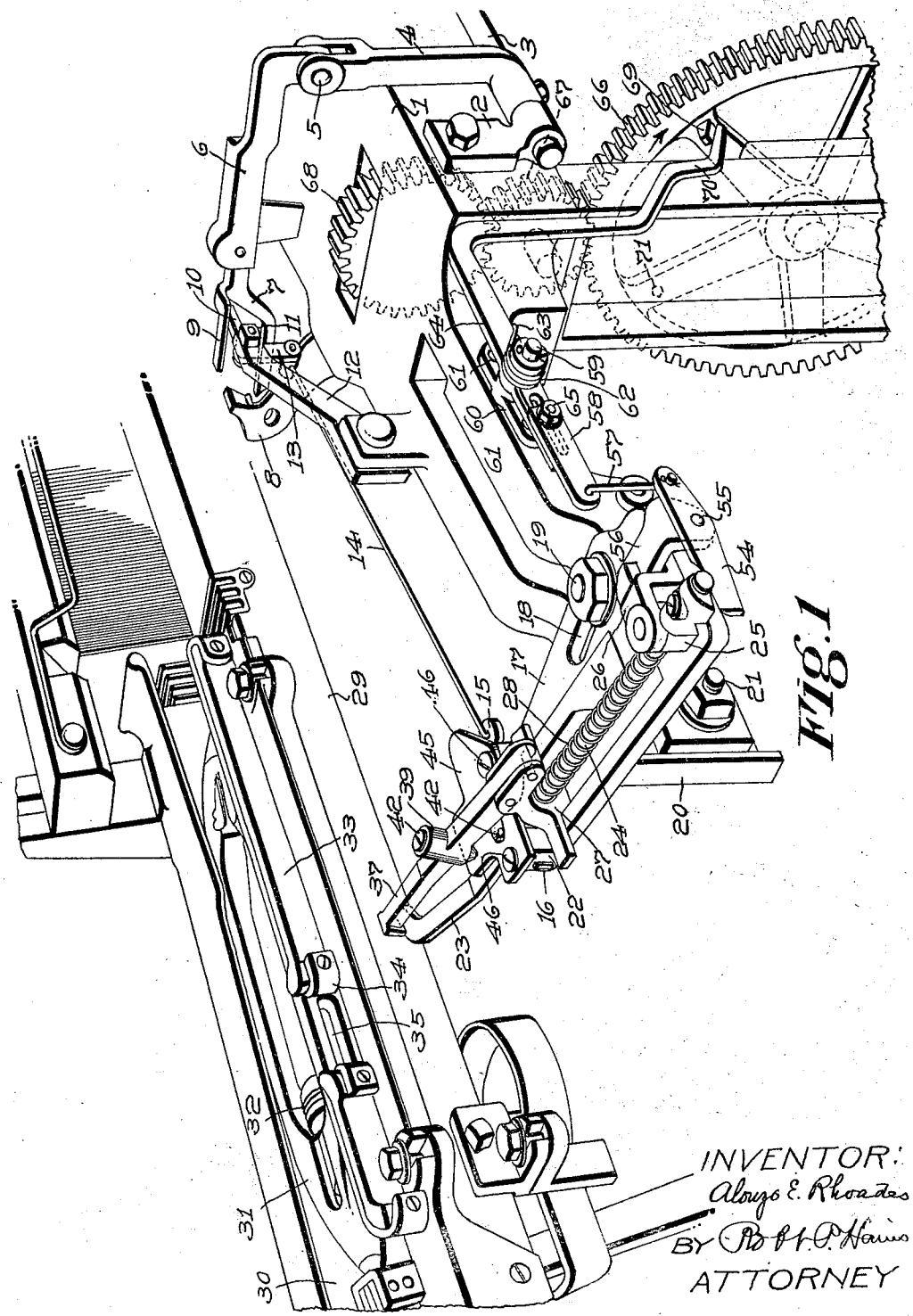
Fig. 1 is a perspective view of the feeler side of a loom having the feeler mechanism of the present invention associated therewith.

The invention is herein shown as associated with a side-swipe type of feeler, in connection with which its advantages are readily observable, but it is to be understood that the invention may be employed in connection with other types of feelers. Since the feeler is to function and change the operative condition of the loom when the filling is substantially exhausted, it is illustrated in connection with a train of mechanism for replenishing the filling in the shuttle when the critical period of exhaustion has been reached, but obviously, the feeler may function to bring about other changes in the operative condition of the loom.

The replenishing mechanism for transferring to the shuttle a new supply of filling when the feeler calls for a change is not here shown and described because it may be of any usual type, and is now well understood by those familiar with weaving.

The loom frame 1 is shown as having secured thereto the bearing brackets 2, one at each side of the loom, in which is mounted for rocking movement the transverse or rock shaft 3, as usual in this type of loom, and rising from the rock shaft 3 is the arm 4 to which is pivotally mounted at 5 the arm 6 which extends rearward and is provided at its end portion with a pivotally supported finger 7 adapted to be engaged at times by an operating member 8 which may be formed conveniently as a part connected to or associated with the cam follower. The finger 7 has an upper portion 9 under which is the arm 10 of the bell crank lever pivoted at 11 on the stand 12 secured to the loom frame. The other arm 13 of the bell crank lever is connected to a transmitter 14 which in the present instance is shown as joined at 15 to a slide 16 mounted for movement transversely of the loom at the rear of the feeler stand.

The feeler stand 17 is shown as provided with a slot 18 by which it may be secured to the loom frame or other support by a bolt 19. In the present instance the feeler stand 17 is supported by a bracket 20 adjustably secured to an extension of the shipper stand by a bolt 21.

At the rear portion of the feeler stand is a guideway or bearing 22 for the slide 16 through which the feeler 23 extends, the slot in the slide 16 being of slightly larger dimensions than the portion of the feeler which extends through it.

The frontwardly extending stem portion 24 of the feeler passes through a front bearing or swivel block 25 supported between a bracket 26 and the feeler stand, and interposed between the swivel block 25 and a collar or bridge 27 is a spring 28 normally tending to move the feeler into its rearward feeling position. In the present instance of the invention the feeler is shown as of the inclined type and the parts so far described may be substantially the same as those shown and described in the Stimpson Patent, No. 1,309,226, dated July 9, 1918, to which reference may be had for a more detailed disclosure of the construction and mode of operation of these parts.

The lay 29 has the usual shuttle box 30 for the reception of the shuttle 31 in which the filling carrier or bobbin 32 is mounted, and the front wall 33 of the shuttle box has an opening 34 which registers with a corresponding opening 35 in the front wall of the shuttle when the latter is properly positioned in the shuttle box on a detecting beat, the purpose of such openings being to admit the feeler 23 during its periods of activity. These parts may also be the same or substantially the same as the corresponding parts shown and described in the Stimpson patent before mentioned.

In accordance with the present invention, the feeler is to be moved to a position beyond the reach of the filling on detecting beats and held in such position during its periods of activity, and to this end the following simple and effective mechanism is provided.

Pivotally connected to the feeler at 36 is a bunter 37 the rear end portion 38 of which is adapted to be engaged and moved frontwardly by a surface carried by the lay on a detecting beat when the bunter is in operative position in order to move the feeler frontwardly beyond the reach of the filling on subsequent detecting beats during its periods of inactivity.

As shown, the bunter 37 is preferably connected to the collar or bridge 27 which is secured to the feeler, and means are provided for normally maintaining the bunter 37 in an inoperative position relative to the surface on the lay with which it may engage when it is permitted to move to its operative position. As shown, the bunter 37 has a socketed member 39 which may be appropriately formed integral with the bunter or be otherwise connected thereto. The part 39 has mounted therein a plunger 40 normally under the influence of a light spring 41 tending to move the plunger downwardly, as shown, and in order to limit the movement of the plunger the latter is provided with a head 42. The spring 41 in the socketed member 39 preferably surrounds the stem of the plunger and is interposed between the top wall of the socketed member 39 and the head 43 of the plunger, the lower end portion of which is formed conical as at 44.

The cap plate 45 which forms a convenient means for holding the slide 16 in its guideway is secured to the rear bearings 22 by screws or equivalent means 46 and the top portion of the cap plate is provided with a socket 47 into which the conical end of the plunger may extend at times or when the bunter 37 is in its operative position.

In order to prevent overthrow movement of the bunter by the spring 41 a stop is conveniently provided and in the present instance is formed by a pin 48 which is engaged by a projection 49 on the bunter when the bunter is moved upwardly by the spring actuated plunger into its normal inoperative position.

The frontwardly extending stem 24 of the feeler is provided with a series of teeth which in the present instance are shown as formed on a collar 50 adjustably secured to the stem 24 of the feeler by a set screw 51. The under portion of the collar 50, in the present instance, has two abutments or teeth 52 and 53 which are adapted to be engaged by a detent to hold the feeler in the frontward position in which it may have been moved. In the present instance the detent 54 is pivotally mounted at 55 on the bracket 56 secured to the feeler stand and is connected by a link 57 to an arm 58 pivotally supported on a stud 59 projecting from the loom frame or shipper stand. In the present instance the stud 59 is shown as formed on or secured to a plate 60 which may be conveniently secured to the feeler stand by bolts 61. A spring 62 has one end secured to the stud 59 and the other end 63 thereof underlies the arm 64 to which the arm 58 is adjustably connected by a bolt 65, the construction being such that the normal tendency of the spring 62 is to yieldingly lift the engaging end of the detent into engagement with one of the teeth on the feeler stem when the feeler is moved into frontward position sufficiently far for that purpose.

In the intermittent type of feeler mechanisms it is desirable to hold the feeler in its inoperative relation with the filling for a period of time and to release it at intervals that it may have periods of activity alternating with periods of inactivity. The releasing mechanism may be variously contrived, but in the present instance it is shown as associated with the take-up mechanism of the loom, which may be of usual character. As shown, the toothed member 66 in the train of take-up mechanism engages a gear 67 which in turn engages a gear 68 connected to the sand or cloth take-up roll. The toothed wheel 66 has mounted thereon a lug or actuator 69 which is adapted at times to engage the end portion 70 extending downwardly from the arm 64 to thereby turn the arm 64 against the action of the spring 62 and trip the actuator from engagement with the teeth carried by the feeler stem. The lug or actuator may be appropriately secured to the toothed wheel 66 or to any one or more of the spokes thereon by providing the latter with an opening 71 and one or more of such lugs or actuators 69 may be employed if desired. The train of mechanism actuated from the take-up or other part of the loom constitutes a controller for controlling the feeler with relation to its periods of activity and inactivity.

Assuming that the feeler is in its rearward feeling position, as indicated in Figs. 1 and 2, the bunter 37 will be held in its inoperative relation with respect to the surface on the lay, the shuttle in the present instance, by the rearwardly projecting portion 72 of the cap plate 45 on which the conical end portion 44 of the plunger may rest. Should the feeler be moved frontwardly by a working supply of filling in the shuttle on a detecting beat, it will move the bunter 37 frontwardly with it into the position indicated in Fig. 3, and the detent 54 under the impulse of the spring 62 will engage the teeth 53 on the feeler stem and hold it and the bunter in frontward position to which they have been moved by the working supply of filling. As the feeler 23 is moved frontwardly, as described, the conical end portion 44 of the plunger will drop into the recess 47 in the cap plate 45, with the result that the bunter will then be in its operative position, so that on the subsequent beat-up movement of the lay, as indicated in Fig. 4, the end of the bunter is in position to be engaged by a surface on the lay to thereby move the bunter and the connected feeler into a further frontward position beyond the reach of the filling on subsequent detecting beats. When the bunter and feeler have thus been moved frontwardly the additional amount, the detent 54 will engage the teeth 52 carried by the feeler stem, with the result that the feeler will then be held in a frontward position beyond contacting relation with any part of the lay on a detecting beat. As hereinbefore noted, the spring 41 for actuating the plunger is of light tension so that when the plunger and feeler are moved frontwardly, as indicated in Fig. 4, the frictional engagement of the end 38 with the shuttle or other surface on the lay will be sufficient to cause the plunger to yield upwardly and pass out or frontwardly with relation to the opening 47 of the cap plate.

When the bunter and feeler have been moved frontwardly as described to their final frontward position beyond reach of the filling on detecting beats, and the lay retreats, the plunger spring 41 will assert itself, as indicated in Fig. 5, and the bunter 37 will be moved again to its inoperative position, as indicated in Fig. 5, so that thereafter neither the feeler nor the bunter will be engaged by a surface carried by the lay during the period of inactivity of the feeler.

When the detent controlling mechanism is actuated to release the feeler, the latter and bunter will move rearwardly to the position indicated in Fig. 2 and should the filling at such time have approached a condition of substantial exhaustion, the feeler will not be moved frontwardly sufficiently far to operatively position the bunter or to cause the detent to engage with the teeth 53 on the feeler stem and consequently the feeler will remain active until, when the filling is substantially exhausted, it will call for a change of filling.

Applicant believes himself to be the first in the art to provide a feeler with a bunter which is moved into operative position by movement of the feeler to cause the bunter to further move the feeler frontwardly beyond the reach of the filling on subsequent detecting beats, and this constitutes one of the main purposes of the present invention.

What is claimed is:

1. In an intermittent feeler mechanism for looms, the combination of a feeler, means for holding the feeler in a frontward inoperative position and freeing it at intervals that the feeler may have periods of activity and periods of inactivity during weaving, a bunter which is moved to an operative position by frontward movement of the feeler on a detecting beat, and a part carried by the lay for moving the bunter and through it the feeler to a further frontward position where the feeler is held by the holding means during its periods of activity.

2. In an intermittent feeler mechanism for looms, the combination of a feeler having periods of activity and inactivity during weaving with the same supply of filling in the shuttle, a normally inoperatively positioned bunter which is operatively positioned through frontward movement of the feeler by a working supply of filling on a detecting beat, a part on the lay for moving the bunter and through it the feeler to a further frontward position out of cooperative relation with the filling, and means for holding the feeler in such position during its periods of inactivity.

3. An intermittent feeler mechanism for looms, comprising, in combination, a feeler, a bunter connected to the feeler, means normally effective for holding the bunter in an inoperative position and rendered ineffective by frontward movement of the feeler that it may be engaged by a surface on the lay to move the feeler beyond the reach of the filling on detecting beats, and means for holding the feeler in such position during its periods of inactivity and freeing it at intervals to its periods of activity.

4. An intermittent feeler mechanism for looms, comprising, in combination, a feeler, a bunter mounted for movement towards and from the front of the loom with the feeler, and adapted to be operatively positioned with relation to a part on the lay by frontward movement of the feeler that on a following frontward movement of the lay the bunter may move the feeler to a position beyond the reach of the filling, and means for holding the feeler in said position during its periods of inactivity and releasing it at intervals to its periods of activity.

5. In an intermittent feeler mechanism for looms, the combination of a feeler, a bunter connected to the feeler, means for holding the bunter in inoperative relation with a part carried by the lay when the feeler is in rearward feeling position and constructed and arranged to permit movement of the bunter into operative position on frontward movement of the feeler by a working supply of filling on a detecting beat that on a subsequent frontward movement of the lay the bunter may engage said part on the lay and move the feeler beyond the reach of the filling.

6. In a feeler mechanism for looms, the combination of the feeler, a bunter connected to the feeler, means for normally maintaining the bunter in an inoperative position and permitting it to move to an operative position when the feeler is moved frontwardly that the bunter may impart a further frontward movement to the feeler on a beat-up movement of the lay, and means for holding the feeler beyond the reach of the filling, and means for releasing the feeler at intervals that it may have periods of activity and inactivity during weaving.

7. In a feeler mechanism for looms, the combination of the feeler, a bunter connected to the feeler, means including a spring for normally maintaining the bunter in an inoperative position and permitting it to move to an operative position when the feeler is moved frontwardly that the bunter may impart a further frontward movement to the feeler on a beat-up movement of the lay, and means for holding the feeler beyond the reach of the filling, and means for releasing the feeler at intervals that it may have periods of activity and inactivity during weaving.

8. In a feeler mechanism for looms, the combination of a feeler, a bunter connected to the feeler, means connected to one of said parts constructed and arranged for holding the bunter out of cooperative relation with a surface on the lay until the feeler is moved frontwardly by a working supply of filling in the shuttle and thereupon permitting the bunter to move to operative position that it may move the feeler beyond the reach of the filling on a detecting beat into a position of inactivity a detent for holding the feeler in frontward inactive position, and means for releasing the feeler at intervals that it may have periods of activity and inactivity during weaving.

9. In an intermittent feeler mechanism for looms, the combination of a feeler, a bunter connected to the feeler, a support for the bunter for holding it in an inoperative relation with a part on the lay when the feeler is in rearward feeling position and having provisions to permit the bunter to move to operative position when the feeler is moved frontwardly by a working supply of filling that the bunter may move the feeler to a further frontward position on a subsequent detecting beat, means for holding the feeler in its final frontward position, and means for freeing the feeler at intervals that it may move to feeling position.

10. In an intermittent feeler mechanism for looms, the combination of a feeler, a bunter, means for controlling the operative position of the bunter with relation to a part on the lay by frontward movement of the feeler that the bunter may move the feeler beyond the reach of the filling on detecting beats into its position of inactivity, means for holding the feeler in its frontward inoperative position and releasing it at intervals, and means for returning the bunter to its inoperative relation with the part on the lay when the feeler is in its frontward position that neither bunter nor feeler will be engaged by a surface or part on the lay during periods of inactivity of the feeler.

11. In an intermittent feeler mechanism for looms, the combination of a feeler having periods of activity and inactivity, a bunter pivotally connected to the feeler, means acting yieldingly upon the bunter to place it in inoperative relation with a part on the lay during the active and inactive periods of the feeler until the feeler is moved frontwardly by a working supply of filling in the shuttle and then permitting the bunter to move to operative position that the bunter may on a subsequent beat of the lay move the feeler beyond the reach of the filling into its position of inactivity means for holding the feeler in its frontward inoperative position and means for freeing the feeler at intervals.

12. In a feeler mechanism for looms, the combination of a feeler, a bunter movable with the feeler, a yielding plunger for holding the bunter in a position of non-contacting relation with a part on the lay, and rendered ineffectual for this purpose when the feeler and bunter are moved frontwardly by a working supply of filling acting on the feeler that the bunter may move into operative position and withdraw the feeler beyond reach of the filling on a subsequent beat of the lay, and means for holding the feeler and bunter in frontward position and releasing them at intervals.

13. In a feeler mechanism for looms, the combination of a feeler, a detent for holding the feeler in frontward position, a bunter connected to the feeler and operatively positioned with relation to a part on the lay by the frontward movement of the feeler, and a part carried by the lay to contact with the bunter when operatively positioned to move the feeler further frontward into its position of inactivity.

14. In a feeler mechanism for looms, the combination of a feeler having detent engaging teeth, a detent for engaging one of the teeth to hold the feeler in front position to which it has been moved by a working supply of filling on a detecting beat, a bunter connected to the feeler and movable into an operative position with a part on the lay by frontward movement of the feeler that on a subsequent detecting beat the bunter may move the feeler further frontward beyond the reach of the filling to be held by the detent, and means for freeing the feeler from the detent at intervals.

In testimony whereof, I have signed my name to this specification.

ALONZO E. RHOADES.